US010379514B2

(12) United States Patent
Balraj

(10) Patent No.: US 10,379,514 B2
(45) Date of Patent: Aug. 13, 2019

(54) SYSTEMS AND METHODS FOR CONTROLLING A HOME AUTOMATION SYSTEM BASED ON IDENTIFYING A USER LOCATION VIA A WI-FI FINGERPRINT

(71) Applicant: Honeywell International Inc., Morristown, NJ (US)

(72) Inventor: KamalaKannan Balraj, Madurai (IN)

(73) Assignee: ADEMCO INC., Golden Valley, MN (US)

( * ) Notice: Subject to any disclaimer, the term of this patent is extended or adjusted under 35 U.S.C. 154(b) by 69 days.

(21) Appl. No.: 15/220,763

(22) Filed: Jul. 27, 2016

(65) Prior Publication Data

US 2018/0032046 A1 Feb. 1, 2018

(51) Int. Cl.
| | |
|---|---|
| *G05B 19/048* | (2006.01) |
| *G05B 11/01* | (2006.01) |
| *G05B 19/042* | (2006.01) |
| *H04L 12/28* | (2006.01) |
| *H04W 4/021* | (2018.01) |
| *H05B 37/02* | (2006.01) |

(52) U.S. Cl.
CPC ............ *G05B 19/048* (2013.01); *G05B 11/01* (2013.01); *G05B 19/0421* (2013.01); *H04L 12/2803* (2013.01); *H04W 4/021* (2013.01); *H05B 37/0272* (2013.01); *G05B 2219/163* (2013.01)

(58) Field of Classification Search
CPC ............................... G05B 19/048; G05B 11/01
See application file for complete search history.

(56) References Cited

U.S. PATENT DOCUMENTS

| | | | |
|---|---|---|---|
| 6,473,661 B1 | 10/2002 | Wollner | |
| 8,412,183 B1 * | 4/2013 | Kadous | G01C 21/206 455/423 |
| 9,357,346 B2 * | 5/2016 | Jagannath | H04W 4/021 |
| 9,408,040 B2 * | 8/2016 | Cooper | H04W 4/043 |
| 9,414,193 B2 * | 8/2016 | Li | H04W 4/021 |

(Continued)

FOREIGN PATENT DOCUMENTS

| | | |
|---|---|---|
| GB | 2471784 A | 1/2011 |
| WO | 2008/059412 A1 | 5/2008 |

(Continued)

OTHER PUBLICATIONS

Extended European search report for corresponding EP patent application 17178498.6, dated Nov. 17, 2017.

(Continued)

*Primary Examiner* — Vincent H Tran
(74) *Attorney, Agent, or Firm* — Husch Blackwell LLP

(57) ABSTRACT

Systems and methods for controlling a home automation system based on identifying a user location via a Wi-Fi fingerprint are provided. Some methods can include receiving one or more signals from a mobile device in a region monitored by the home automation system, identifying a signal strength of the one or more signals, based on the signal strength of the one or more signals, identifying a Wi-Fi fingerprint to be associated with the mobile device, identifying known coordinates within the region that are associated with the Wi-Fi fingerprint to be a location of the mobile device, and based on the location of the mobile device, identifying one or more actions to be executed by the home automation system.

14 Claims, 1 Drawing Sheet

(56) References Cited

U.S. PATENT DOCUMENTS

| | | | |
|---|---|---|---|
| 9,684,357 B2* | 6/2017 | Bostick | G06F 1/3231 |
| 9,775,003 B2* | 9/2017 | Ciecko | H04W 4/029 |
| 9,961,507 B1* | 5/2018 | Mendelson | H04W 4/90 |
| 10,075,814 B2* | 9/2018 | Sydir | H04W 4/025 |
| 2013/0131973 A1* | 5/2013 | Friedler | G01C 21/20 |
| | | | 701/409 |
| 2013/0158941 A1* | 6/2013 | Yang | G01C 21/10 |
| | | | 702/141 |
| 2013/0178226 A1* | 7/2013 | Ye | H04W 64/00 |
| | | | 455/456.1 |
| 2013/0260790 A1* | 10/2013 | Itzhaki | H04W 4/02 |
| | | | 455/456.1 |
| 2014/0018096 A1* | 1/2014 | Jagannath | H04W 4/021 |
| | | | 455/456.1 |
| 2014/0315570 A1* | 10/2014 | Yun | H04W 4/043 |
| | | | 455/456.1 |
| 2015/0072674 A1 | 3/2015 | Shoemaker et al. | |
| 2015/0081583 A1* | 3/2015 | Butler | G06Q 10/0833 |
| | | | 705/333 |
| 2015/0163634 A1* | 6/2015 | Meredith | H04W 4/023 |
| | | | 455/456.6 |
| 2015/0281910 A1* | 10/2015 | Choudhury | G01S 5/021 |
| | | | 455/456.1 |
| 2015/0332586 A1 | 11/2015 | Hamm et al. | |
| 2015/0347114 A1* | 12/2015 | Yoon | G06F 8/61 |
| | | | 235/375 |
| 2015/0382339 A1* | 12/2015 | Andreoli-Fang | H04L 51/38 |
| | | | 370/329 |
| 2016/0025498 A1* | 1/2016 | Le Grand | G01C 21/12 |
| | | | 701/469 |
| 2016/0178383 A1* | 6/2016 | Mays | G01C 21/3673 |
| | | | 701/408 |
| 2016/0223998 A1* | 8/2016 | Songkakul | G05B 15/02 |
| 2016/0267440 A1* | 9/2016 | LeBeau | G06Q 10/1095 |
| 2016/0316343 A1* | 10/2016 | Kan | H04W 4/022 |
| 2016/0330779 A1* | 11/2016 | Neumann | H04W 4/026 |
| 2017/0134909 A1* | 5/2017 | Gu | H04W 4/043 |
| 2017/0142542 A1* | 5/2017 | Chiu | H04L 67/26 |

FOREIGN PATENT DOCUMENTS

| | | |
|---|---|---|
| WO | 2015/022650 A1 | 2/2015 |
| WO | 2015/025235 A1 | 2/2015 |

OTHER PUBLICATIONS

Jiang et al., ARIEL: Automatic WiFi based Room Fingerprinting for Indoor Localization, Ubiquitous Computing, ACM, pp. 441-450, New York, NY, Sep. 5, 2012.

EP examination report for corresponding EP patent application 17178498.6, dated Apr. 3, 2018.

Chen et al., An Improved Algorithm to Generate a Wi-Fi Fingerprint Database for Indoor Positioning, Sensors 2013, vol. 13, pp. 11085-11096, www.mdpi.com/journal/sensors, Aug. 21, 2013.

* cited by examiner

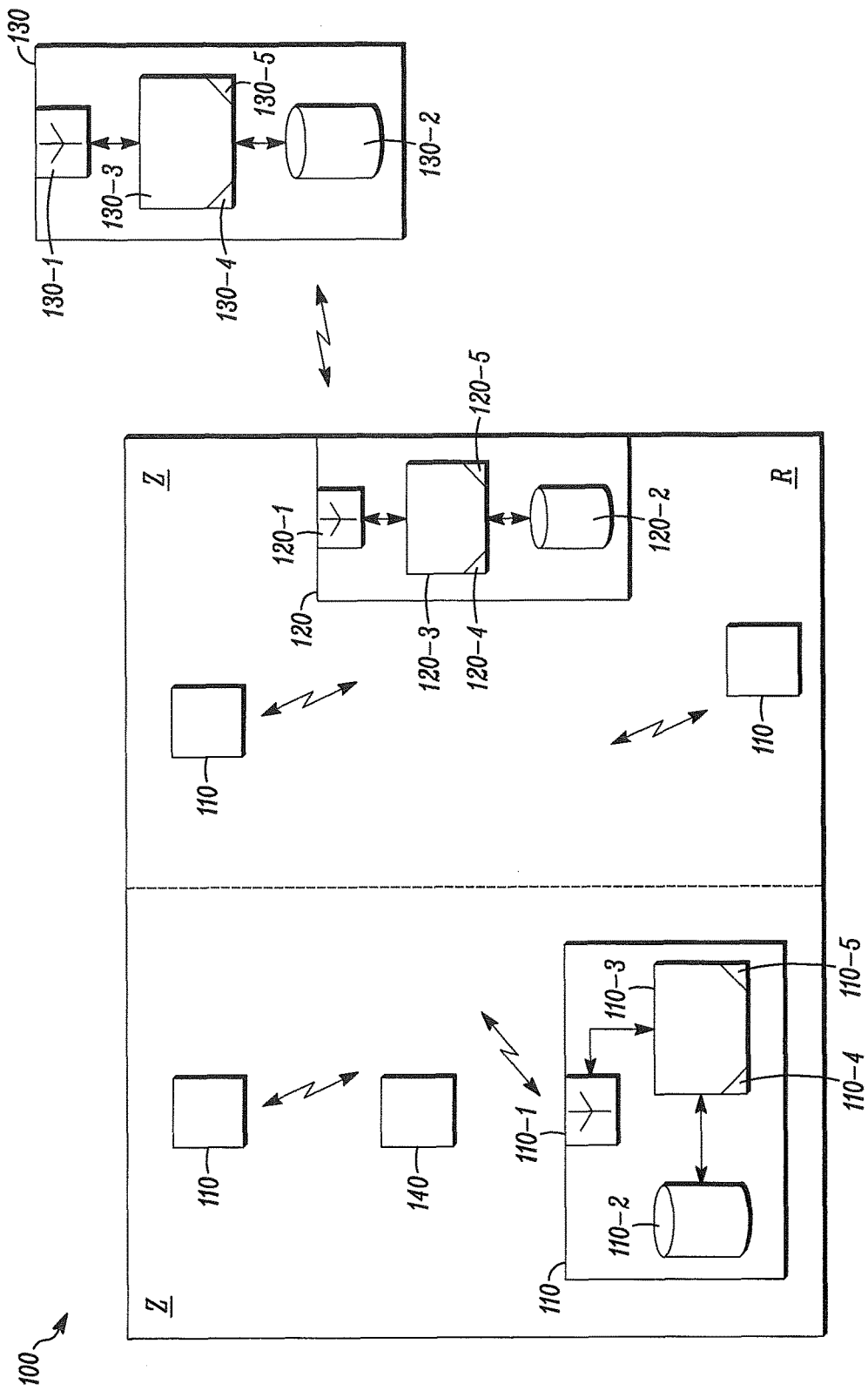

SYSTEMS AND METHODS FOR CONTROLLING A HOME AUTOMATION SYSTEM BASED ON IDENTIFYING A USER LOCATION VIA A WI-FI FINGERPRINT

FIELD

The present invention relates generally to home automation systems. More particularly, the present invention relates to systems and methods for controlling a home automation system based on identifying a user location via a Wi-Fi fingerprint.

BACKGROUND

Scene execution in a home automation system relates to preconfiguring a scene, or a set of actions, to be taken by one or more specified devices in the system when one or more events occur. For example, a vacation scene can include instructing lighting devices in the system to be turned on at a first set of predetermined times and to be turned off at a second set of predetermined times.

Bypassing a zone in a home automation system relates to deactivating one or more zones in a region monitored by the system before arming the system. Once the system is armed, the system will not monitor bypassed zones.

Executing scenes and bypassing zones are known in the art. For example, in known home automation systems, scenes are executed and zones are bypassed based on predetermined schedules or manual user input. However, these known systems fail to account for the location of users in a region monitored by the home automation system.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for controlling a home automation system based on identifying a user location via a Wi-Fi fingerprint. For example, in some embodiments, systems and methods disclosed herein can receive one or more signals, for example, Wi-Fi signals, from a user's mobile device, including, but not limited to, a smart phone, a mobile phone, a wearable device, and a personal digital assistant, and use the received signals to identify the location of the user. Based on the user location, systems and methods disclosed herein can execute one or more scenes in a home automation system or bypass a zone in a region monitored by a home automation system.

Systems and methods disclosed herein are described in connection with home automation systems. However, it is to be understood that systems and methods disclosed herein are not so limited and can be used in connection with any system in which controlling the system based on an identified location of a user would be helpful.

In accordance with disclosed embodiments, systems and methods disclosed herein can create a Wi-Fi fingerprint database or a Wi-Fi fingerprint based map when configuring system devices with a system control panel. For example, a Wi-Fi fingerprint can include known coordinates (in the x, y, and z directions) in a monitored region cross-referenced with one or values of Wi-Fi signal strength of a signal received by the system device from a second device at those known coordinates. In some embodiments, each Wi-Fi fingerprint in the database can be mapped to a Wi-Fi fence that includes a Wi-Fi radius from the known coordinates of the Wi-Fi fingerprint indicative of the fenced area in which system devices receive and transmit signals with a second device at the known coordinates of the Wi-Fi fingerprint. In some embodiments, each Wi-Fi fingerprint in the database can be mapped to a Wi-Fi fence that identifies zone information indicative of one or more zones in the monitored region, as well as the system devices located therein, that are relevant to the second device at the known coordinates of the Wi-Fi fingerprint.

In some embodiments, after the configuration of system devices and the creation of the Wi-Fi fingerprint database or the Wi-Fi fingerprint based map, one or more system devices can receive one or more signals from a user's mobile device, and systems and methods disclosed herein can determine the Wi-Fi signal strength of the received signals at each of the system devices and cross-reference the Wi-Fi fingerprint database with the determined Wi-Fi signal strength to identify a Wi-Fi fingerprint to be associated with the user's mobile device. Upon the one or more system devices receiving the one or more signals from the user's mobile device and identifying a Wi-Fi fingerprint to be associated with the user's mobile device, systems and methods disclosed herein can identify the known coordinates of the identified Wi-Fi fingerprint to be the location of the user's mobile device. Furthermore, in some embodiments, systems and methods disclosed herein can identify zone information associated with the identified Wi-Fi fingerprint. In some embodiments, when the one or more signals received from the mobile device are the first signals that the one or more system devices received from that mobile device, systems and methods disclosed herein can identify the known coordinates of the identified Wi-Fi fingerprint as the entry point of the user's mobile device in the monitored region.

In some embodiments, after identifying the location of the user's mobile device in the monitored region, one or more system devices can continue to receive one or more signals from the user's mobile device, including signals from one or more directional sensors in the mobile device, such as an altimeter, a gyroscope, a compass, and an accelerometer. Systems and methods disclosed herein can use the identified location of the user's mobile device and the signals from the directional sensors in the mobile device to identify information about motion or movement of the user's mobile device, including a direction and speed thereof.

In some embodiments, systems and methods disclosed herein can use at least some of the identified location of the user's mobile device, the identified zone information associated with the identified Wi-Fi fingerprint of the user's mobile device, and the identified information about the motion or movement of the user's mobile device to identify one or more scenes in a home automation system to be executed or to identify one or more zones in a region monitored by a home automation system to be bypassed. For example, based on the identified location of the user's mobile device and the identified zone in which the user's mobile device is located, systems and methods can identify one or more scenes to be executed for the identified zone or for zones in the monitored region that are outside of the identified zone. Additionally or alternatively, based on the identified location of the user's mobile device and the identified zone in which the user's mobile device is located, systems and methods can determine that the identified zone should be bypassed or that zones in the monitored region that are outside of the identified zones should be bypassed.

In accordance with the above and below described embodiments of systems and methods disclosed herein, it can be understood that systems and methods disclosed herein advantageously can identify the location of a user's mobile device in a monitored region, what actions to take, such as scenes to be executed or zones to be bypassed, and the location for taking such actions absent a blueprint of the monitored region. Furthermore, it can be understood that systems and methods disclosed herein advantageously can identify the location of a user's mobile device based on the signals received therefrom and without executing triangulation methods as is known in the art. Further still, it can be understood that systems and methods disclosed herein advantageously can identify the location of a user's mobile device in a monitored region, what actions to take, such as scenes to be executed or zones to be bypassed, and the location for taking such actions absent user interaction with a user interface device or control panel of a home automation system in the monitored region.

FIG. 1 is a block diagram of a system 100 in accordance with disclosed embodiments. In some embodiments, the system 100 can include a home automation system, and as seen in FIG. 1, the system 100 can include one or more system devices 110 in a monitored region R such that the devices are distributed throughout a plurality of different zones Z within the region R. The system 100 can also include a control panel device 120 in communication with each of the system devices 110 and a central monitoring station 130 in communication with the control panel device 120.

Each of the system devices 110, control panel device 120, and central monitoring station 130 can include a transceiver device 110-1, 120-1, 130-1 and a memory device 110-2, 120-2, 130-2, each of which can be in communication with control circuitry 110-3, 120-3, 130-3, one or more programmable processors 110-4, 120-4, 130-4, and executable control software 110-5, 120-5, 130-5 as would be understood by one of ordinary skill in the art. The executable control software 110-5, 120-5, 130-5 can be stored on a transitory or non-transitory computer readable medium, including, but not limited to, local computer memory, RAM, optical storage media, magnetic storage media, flash memory, and the like. In some embodiments, the control circuitry 110-3, 120-3, 130-3, programmable processor 110-4, 120-4, 130-4, and control software 110-5, 120-5, 130-5 can execute and control at least some of the methods described above and herein.

For example, when each of the system devices 110 is configured with the control panel device 120, the control panel device 120 and/or the central monitoring station 130 can create a Wi-Fi fingerprint database or a Wi-Fi fingerprint based map using signals that each of the system devices 110 receives from a testing device at known coordinates in the region R. The Wi-Fi fingerprint database or the Wi-Fi fingerprint based map can be saved in one or more of the memory devices 110-2, 120-2, 130-2. After configuration, when one or more of the system devices 110 receives one or more signals from a user's mobile device 140 in the region, the respective system device 110 or the control panel device 120 and/or the central monitoring station 130 can determine the Wi-Fi signal strength of each of the received signals, and, based thereon, the control panel device 120 and/or the central monitoring station 130 can identify a Wi-Fi fingerprint to be associated with the mobile device 140, identify the known coordinates of the identified Wi-Fi fingerprint to be the location of the mobile device 140, identify zone information associated with the identified Wi-Fi fingerprint, and identify motion or movement information associated with the mobile device 140.

Based on at least some of the identified location of the mobile device 140, the identified zone information, or the identified motion or movement information, the control panel device 120 and/or the central monitoring station 130 can identify one or more scenes to be executed by one or more of the system devices 110 or identify one or more zones Z to be bypassed. For example, when the systems and methods disclosed herein determine that the mobile device 140 is in a first zone Z that includes a first set of system devices 110, the control panel device 120 and/or the central monitoring station 130 can identify a scene to be executed by the first set of system devices 110 within the first zone Z or can determine that the first zone Z should be bypassed. Additionally or alternatively, when the systems and methods disclosed herein determine that the mobile device 140 is in a first zone Z that includes a first set of system devices 110, the control panel device 120 and/or the central monitoring station 130 can identify a scene to be executed by system devices 110 that are not in the first set of system devices 110 or that are not within the first zone Z or can determine that one or more zones Z that are outside of the first zone Z should be bypassed.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:

creating a Wi-Fi fingerprint database of a plurality of Wi-Fi fingerprints, each of the plurality of Wi-Fi fingerprints cross-referencing respective known coordinates in a monitored region with respective values of Wi-Fi signal strength received by a respective one of a plurality of system devices from a testing device at the respective known coordinates, mapping each of the plurality of Wi-Fi fingerprints to respective zone information identified by a respective Wi-Fi fence that is indicative of one or more zones in the monitored region and that is defined by a respective Wi-Fi radius extending from the respective known coordinates that are cross-referenced with a respective one of the plurality of Wi-Fi fingerprints, receiving a first signal from a wireless transceiver within a mobile device in the monitored region;

identifying a received signal strength of the first signal;

based on the received signal strength of the first signal, identifying a first of the plurality of Wi-Fi fingerprints to be associated with the mobile device;

identifying the respective known coordinates cross-referenced with the first of the plurality of Wi-Fi fingerprints to be a location of the mobile device;

after identifying the location of the mobile device, receiving a second signal from at least one directional sensor within the mobile device;

based on the location of the mobile device and the second signal, identifying a direction or speed of motion of the mobile device; and based on the location of the mobile device, the direction or speed of motion of the mobile device, and the respective zone information mapped to the first of the plurality of Wi-Fi fingerprints, identifying one or more actions to be executed by a system.

2. The method of claim 1 wherein identifying the one or more actions to be executed by the system includes identifying one or more scenes to be executed by the system and identifying first ones of the plurality of system devices to execute the one or more scenes.

3. The method of claim 2 further comprising identifying the first ones of the plurality of system devices within a predetermined distance of the location of the mobile device to execute the one or more scenes.

4. The method of claim 2 further comprising identifying the first ones of the plurality of system devices outside of a predetermined distance of the location of the mobile device to execute the one or more scenes.

5. The method of claim 1 wherein identifying the one or more actions to be executed by the system includes identifying some of the one or more zones for the system to bypass monitoring when the system is armed.

6. The method of claim 5 wherein the some of the one or more zones include a first of the one or more zones that includes the location of the mobile device.

7. The method of claim 5 wherein the some of the one or more zones include all of the one or more zones outside of a first of the one or more zones that includes the location of the mobile device.

8. A system comprising:
a plurality of system devices;
a control panel device;
a mobile device that includes a wireless transceiver and a directional sensor; and
a database device,
wherein the control panel device creates a Wi-Fi fingerprint database of a plurality of Wi-Fi fingerprints in the database device,
wherein each of the plurality of Wi-Fi fingerprints cross-references respective known coordinates in a monitored region with respective values of Wi-Fi signal strength received by a respective one of the plurality of system devices from a testing device at the respective known coordinates, wherein the control panel device maps each of the plurality of Wi-Fi fingerprints to respective zone information identified by a respective Wi-Fi fence that is indicative of one or more zones in the monitored region and that is defined by a respective Wi-Fi radius extending from the respective known coordinates that are cross-referenced with a respective one of the plurality of Wi-Fi fingerprints, wherein a first of the plurality of system devices signal from the wireless transceiver when the mobile device is in the monitored region, wherein the control panel device identifies a received signal strength of the first signal, wherein, based on the received signal strength of the first signal, the control panel device identifies a first of the plurality of Wi-Fi fingerprints stored in the database device to be associated with the mobile device, wherein the control panel device identifies the respective known coordinates cross-referenced with the first of the plurality of Wi-Fi fingerprints to be a location of the mobile device, wherein, after identifying the location of the mobile device, the first of the plurality of system devices receives a second signal from the directional sensor, wherein, based on the location of the mobile device and the second signal, the control panel device identifies a direction or speed of motion of the mobile device, and wherein, based on the location of the mobile device, the direction or speed of motion of the mobile device, and the respective zone information mapped to the first of the plurality of Wi-Fi fingerprints, the control panel device identifies one or more actions to execute.

9. The system of claim 8 wherein, based on the location of the mobile device, the control panel device identifies one or more scenes to execute and identifies first ones of the plurality of system devices to execute the one or more scenes.

10. The system of claim 9 wherein the control panel device identifies the first ones of the plurality of system devices within a predetermined distance of the location of the mobile device to execute the one or more scenes.

11. The system of claim 9 wherein the control panel device identifies the first ones of the plurality of system devices outside of a predetermined distance of the location of the mobile device to execute the one or more scenes.

12. The system of claim 8 wherein, based on the location of the mobile device, the control panel device identifies some of the one or more zones to bypass monitoring when the control panel device is armed.

13. The system of claim 12 wherein the some of the one or more zones include a first of the one or more zones that includes the location of the mobile device.

14. The system of claim 12 wherein the some of the one or more zones include all of the one or more zones outside of a first of the one or more zones that includes the location of the mobile device.

* * * * *